US010775926B2

United States Patent
Jhang et al.

(10) Patent No.: US 10,775,926 B2
(45) Date of Patent: Sep. 15, 2020

(54) METHOD OF PERFORMING TOUCH SENSING AND FINGERPRINT SENSING SIMULTANEOUSLY AND ELECTRONIC DEVICE AND SYSTEM USING THE SAME

(71) Applicant: NOVATEK Microelectronics Corp., Hsin-Chu (TW)

(72) Inventors: Cho-Hsuan Jhang, Hsinchu (TW); Chih-Peng Hsia, Hsinchu County (TW); He-Jen Chen, New Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/708,351

(22) Filed: Dec. 9, 2019

(65) Prior Publication Data

US 2020/0241725 A1 Jul. 30, 2020

Related U.S. Application Data

(60) Provisional application No. 62/797,368, filed on Jan. 28, 2019.

(51) Int. Cl.
*G06F 3/041* (2006.01)
*G06K 9/00* (2006.01)

(52) U.S. Cl.
CPC ........ *G06F 3/04166* (2019.05); *G06F 3/0412* (2013.01); *G06K 9/00013* (2013.01)

(58) Field of Classification Search
CPC .... G06K 9/00; H04N 1/44; G06F 3/04; G06F 3/041; G06F 3/044; G06F 3/045; G09G 3/00; G09G 3/36; G09G 5/00
See application file for complete search history.

(56) References Cited

U.S. PATENT DOCUMENTS

| | | | |
|---|---|---|---|
| 2017/0200037 A1* | 7/2017 | Hong | H04N 1/442 |
| 2017/0344787 A1* | 11/2017 | Cho | G06K 9/00013 |
| 2018/0173923 A1* | 6/2018 | Lee | G06F 3/0412 |
| 2020/0183563 A1* | 6/2020 | Weng | G06F 3/0412 |

* cited by examiner

*Primary Examiner* — Pegeman Karimi
(74) *Attorney, Agent, or Firm* — Winston Hsu

(57) ABSTRACT

An electronic device, capable of performing a touch sensing operation and a fingerprint sensing operation simultaneously, is provided. The electronic device comprises a touch sensing control circuit; and a fingerprint sensing control circuit; wherein the touch sensing control circuit senses a first touch on a sensing region of a panel, and the touch sensing control circuit provides a first location information corresponding to the first touch; wherein a fingerprint region is determined in the sensing region according to the first location information, and the fingerprint region encompasses a location of the first touch; wherein the fingerprint sensing control circuit performs the fingerprint sensing operation on the fingerprint region during a first sensing time, and the electronic device performs the touch sensing operation on the sensing region except the fingerprint region during the first sensing time.

22 Claims, 5 Drawing Sheets

METHOD OF PERFORMING TOUCH SENSING AND FINGERPRINT SENSING SIMULTANEOUSLY AND ELECTRONIC DEVICE AND SYSTEM USING THE SAME

CROSS REFERENCE TO RELATED APPLICATIONS

The present application claims the benefit of U.S. provisional application No. 62/797,368, filed on Jan. 28, 2019, which is incorporated herein by reference.

BACKGROUND OF THE INVENTION

1. Field of the Invention

The present invention relates to an electronic device, an electronic system and a method, and more particularly, to an electronic device, an electronic system and a method capable of performing touch sensing and fingerprint sensing simultaneously.

2. Description of the Prior Art

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

In addition, the operating interfaces of various electronic products gradually become more user-friendly in recent years. For example, through the touch panel, the user can directly operate on the screen with a finger or a stylus to input a message/text/pattern, which spares the trouble of using an input device such as a keyboard or a button. In fact, the touch panel usually includes a sensing panel and a monitor disposed behind the sensing panel. The electronic device determines the meaning of the touch events according to the location of the touch made by the user on the sensing panel and the content displayed by the monitor, and performs the corresponding operations. It is desired to perform the touch sensing operation and the fingerprint sensing by the same device.

SUMMARY OF THE INVENTION

It is therefore a primary objective of the present invention to provide an electronic device, an electronic system and a method capable of performing touch sensing and fingerprint sensing simultaneously.

An embodiment of the present invention discloses an electronic device capable of performing a touch sensing operation and a fingerprint sensing operation simultaneously. The electronic device comprises a touch sensing control circuit; and a fingerprint sensing control circuit; wherein the touch sensing control circuit senses a first touch on a sensing region of a panel, and the touch sensing control circuit provides a first location information corresponding to the first touch; wherein a fingerprint region is determined in the sensing region according to the first location information, and the fingerprint region encompasses a location of the first touch; wherein the fingerprint sensing control circuit performs the fingerprint sensing operation on the fingerprint region during a first sensing time, and the electronic device performs the touch sensing operation on the sensing region except the fingerprint region during the first sensing time.

Another embodiment of the present invention further discloses an electronic system capable of performing a touch sensing operation and a fingerprint sensing operation simultaneously. The electronic system comprises a panel; and an electronic device. The electronic device comprises a touch sensing control circuit; and a fingerprint sensing control circuit; wherein the touch sensing control circuit senses a first touch on a sensing region of the panel, and the touch sensing control circuit provides a first location information corresponding to the first touch; wherein a fingerprint region is determined in the sensing region according to the first location information, and the fingerprint region encompasses a location of first the touch; wherein the fingerprint sensing control circuit performs the fingerprint sensing operation on the fingerprint region during a first sensing time, and the electronic device performs the touch sensing operation on the sensing region except the fingerprint region during the first sensing time.

Another embodiment of the present invention further discloses a method applied in an electronic device. The method comprises sensing a touch on a sensing region of a panel, and providing a location information corresponding to the touch; forming a fingerprint region according to the location information, wherein the fingerprint region encompasses the touch; performing a fingerprint sensing operation on the fingerprint region during a sensing time; and performing a touch sensing operation on the sensing region except the fingerprint region during the sensing time.

These and other objectives of the present invention will no doubt become obvious to those of ordinary skill in the art after reading the following detailed description of the preferred embodiment that is illustrated in the various figures and drawings.

DETAILED DESCRIPTION

It is noted that the circuits, although shown as different circuits for purpose of explanation, can be implemented as separate circuits, or partially or totally integrated as the same circuit. In other words, the system may comprise a first circuit, configured to perform touch sensing, a second circuit, configured to performed fingerprint sensing, and a third circuit, configured to control or process data received from the first and second circuits. A part or whole of any of the first, second and third circuits can be integrated with or separated with a part or whole of any other(s) of the first, second and third circuits.

Some embodiments disclose methods and electronics capable of performing the touch sensing operation and the fingerprint sensing operation simultaneously. The methods and device in the embodiments can mitigate interference caused by the fingerprint sensing operation to the touch sensing control circuit/operation. In other words, when fingerprint sensing operation is performed, disturbance to the signal received for touch sensing operation can be reduced and the touch sensing operation can be functioned better.

Figure 1:
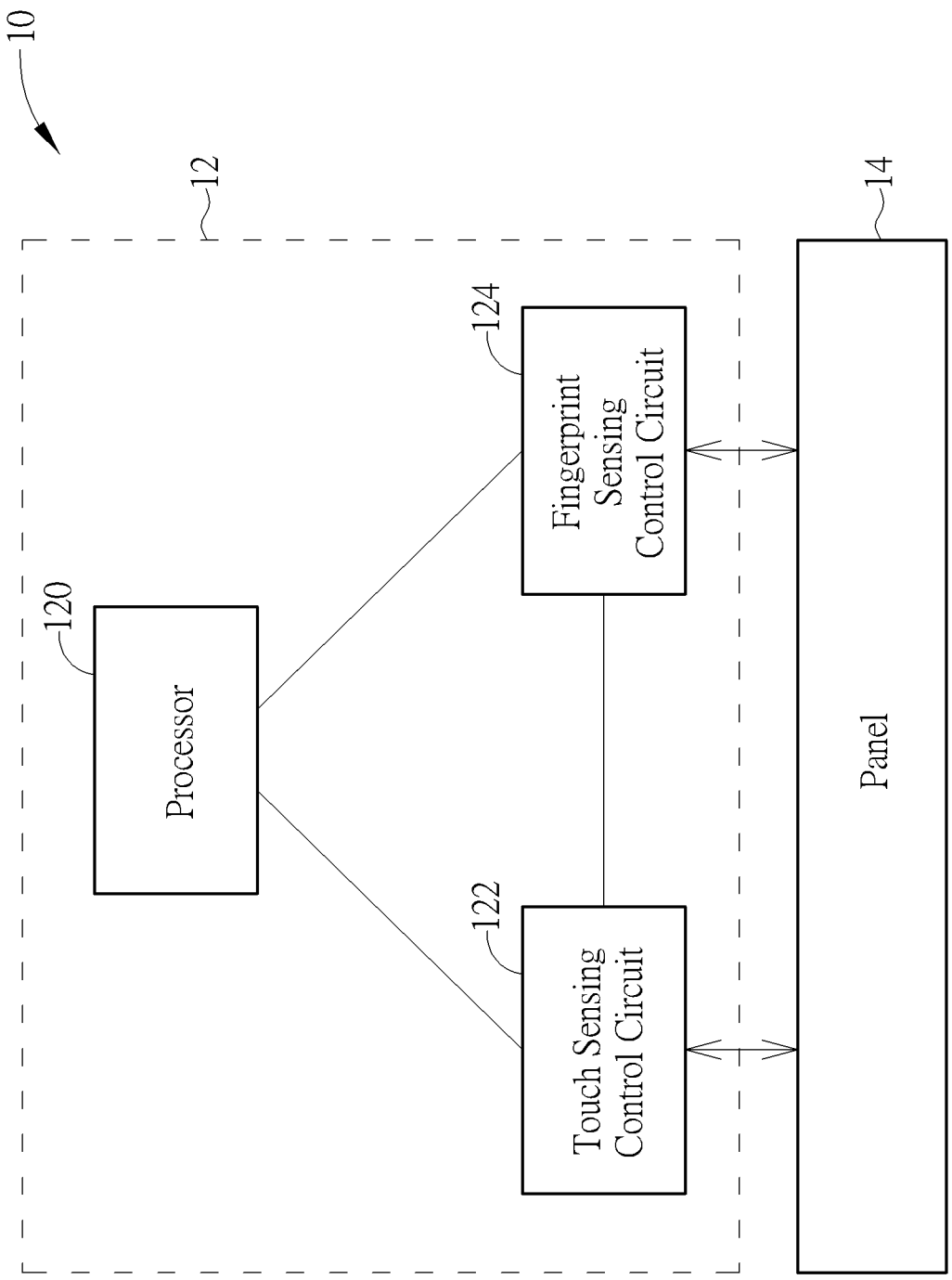
FIG. 1 is a schematic diagram of an electronic system according to an embodiment of the present invention.

FIG. 1 is a schematic diagram of an electronic system 10 according to an embodiment of the present invention. The electronic system 10 comprises an electronic device 12 and a panel 14. The electronic device 12 comprises a touch sensing control circuit 122 and a fingerprint sensing control circuit 124, which may be separated as two chips or integrated as a single chip. In some embodiments, the electronic device 12 comprises a processor 120 as shown, capable of communicating with the touch control circuit 122 and the fingerprint sensing control circuit 124. The processor 120 may be disposed in the chip comprising at least one of the touch sensing control circuit 122 and the fingerprint sensing control circuit 124. In the same or alternative embodiments, the electronic device 12 can communicate with a processor disposed external to the electronic device (not shown), for example, an application processor. The application processor can be configured to identify or confirm an identity of an individual based on comparison of the fingerprint received from the fingerprint sensing control circuit 124 and a registered fingerprint. In addition, the processor can be a gesture based on the touch information generated by the touch control circuit 122. In other words, one or more processors can be disposed internal or external to the electronic device 12 and can handle tasks and communicate with the other circuits according to design requirements, which are not limited in the disclosure. Each of the touch sensing control circuit 122 and the fingerprint sensing control circuit 124 can comprise at least one reading circuit, and at least one analog-to-digital converter (ADC), and a data processing circuit, wherein the reading circuit is arranged to receive a sensing signal from the panel and output an analog sensing data; the ADC is coupled to the reading circuit and arranged to receive and convert the analog sensing data to digital sensing data; and the data processing circuit is coupled to the ADC to receive and processing the digital sensing data and provide the processed digital sensing data to the processor 120 and/or the other one of the touch sensing control circuit 122 and the fingerprint sensing control circuit 124.

The electronic system 10 may be disposed in, for example, a mobile phone, a tablet computer, etc., which is required to perform a touch sensing operation (performed by the touch sensing control circuit 122) and a fingerprint sensing operation (performed by the fingerprint sensing control circuit 124). The touch sensing operation (or the touch sensing control circuit 122) is to sense a location or a trajectory of a touch on the panel 14. The fingerprint sensing operation (or the fingerprint sensing control circuit 124) is to sense a fingerprint when a finger is pressed on the panel 14 and provide fingerprint sensing information to a processor such that the processor can identify or recognize the fingerprint.

The panel 14 can be any kinds of panel have a sensing region capable of sensing touch and fingerprint. In some embodiments, a touch sensing region can be a whole region of a display region. For example, The panel can be a touch display panel. Those skilled in the art should readily understand the implementation applied to a touch display panel. The detailed description is omitted here for brevity. The touch display panel for example may be a touch LCD (liquid-crystal display) panel or a touch LED (Light-Emitting Diode) panel such as a touch OLED (Organic Light-Emitting Diode) panel. In some embodiments, the display panel can comprise a fingerprint sensor arranged as one of an on-display configuration, an-under-display configuration, a local in-display configuration and a global in-display configuration. That is, the fingerprint sensor controlled by the fingerprint sensing control circuit 124 may, but not limited to, be disposed within the display pixel circuitry (i.e., in-display), or be disposed above the display pixel circuitry (i.e., on-display). The fingerprint sensor, for example, can be an optical fingerprint sensor or capacitive fingerprint sensor or ultrasonic fingerprint sensor. In some other embodiments, the fingerprint sensor can disposed in a touch sensing module device comprising the fingerprint sensing circuit. In some embodiments, a fingerprint sensing region can be a whole region or a partial region of the display region. In other words, the sensing region capable of sensing touch and fingerprint be the whole region or the partial region of the display region.

Performing the touch sensing operation and the fingerprint sensing operation simultaneously is a design challenge. It is because the fingerprint sensing operation would cause severe interference to the touch sensing control circuit/operation. In other words, when fingerprint sensing operation is performed, the signal received for touch sensing operation is disturbed and the touch sensing operation is not able to be functioned well.

To bypass this problem, in the embodiment of the present invention, the electronic device 12 may crop a fingerprint region $R_R$ from a sensing region $R_S$, and the touch sensing control circuit 122 performs the touch sensing operation on the sensing region $R_S$ (or on the panel 14) except the fingerprint region $R_R$ when the fingerprint sensing control circuit 124 performs the fingerprint sensing operation. The sensing region $R_S$ represents a region on the panel where the touch sensing control circuit 122 is allowed to perform the touch sensing operation. In other words, if the fingerprint sensing control circuit 124 performs the fingerprint sensing operation on the fingerprint region $R_R$ during a sensing time $T_R$, the touch sensing control circuit 122 does not perform the touch sensing operation on the fingerprint region $R_R$ but performs the touch sensing operation on the sensing region $R_S$ except the fingerprint region $R_R$ during the sensing time $T_R$.

Specifically, the touch sensing control circuit 122 may sense a touch on the sensing region $R_S$ of the panel 14. In addition, the electronic device 12 would determine whether the touch is a fingerprint (i.e., determine whether the fingerprint sensing operation is about to be performed). In an embodiment, if the electronic device 12 (the touch sensing control circuit 122 or the processor 120) finds that the touch stays on the panel 14 over a specific time, e.g., two or three frame intervals, the electronic device 12 (the touch sensing control circuit 122 or the processor 120) would determine the touch is a fingerprint (i.e., determine the fingerprint sensing operation is about to be performed) and the electronic device 12 (the touch sensing control circuit 122 or the processor 120) would trigger/initiate the fingerprint sensing control circuit 124 to perform the fingerprint sensing operation. In other words, the touch is determined to be the fingerprint when/if a touch time, a time of the touch remaining on the panel 14, of the touch is longer than a threshold time. In events where the electronic device 12 determines the touch is the fingerprint, the electronic device 12 can determine the fingerprint region $R_R$.

After the electronic device 12 determines the touch is a fingerprint (i.e., determine the fingerprint sensing operation is about to be performed) and trigger/initiate the fingerprint sensing operation, the touch sensing control circuit 122 or the processor 120 provides location information LI corresponding to the touch (or information about the fingerprint region $R_R$), to the fingerprint sensing control circuit 124. Alternatively, the touch sensing control circuit 122 provides the location information LI to the processor 120 which then provides the fingerprint sensing control circuit 124 with the location information L1 (or information about the fingerprint region $R_R$). The location information LI may comprise at least one touch coordinate or a touch area of the touch. The fingerprint sensing control circuit 124 or the processor 120 would determine the fingerprint region $R_R$ according to the location information LI, where the fingerprint region $R_R$ encompasses the touch coordinate and the touch area on the panel 14 corresponding to the touch.

Figure 2:
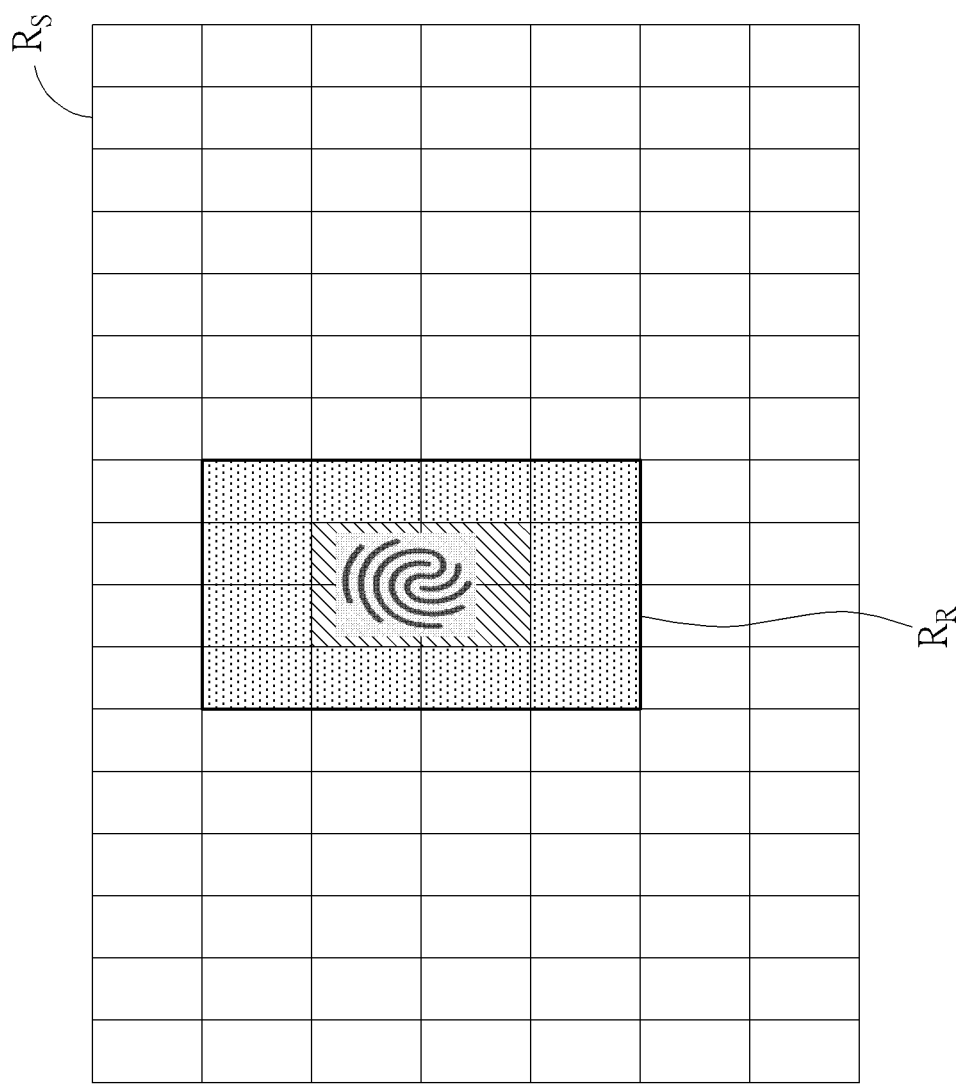
FIG. 2 is a schematic diagram of a fingerprint region and a sensing region according to an embodiment of the present invention.

FIG. 2 is a schematic diagram of the fingerprint region $R_R$ and the sensing region $R_S$. In FIG. 2, white grids represent the sensing region $R_S$, dotted grids and slashed grids represent the fingerprint region $R_R$. The slashed grids may represent a main region which encompasses the touch area of the touch. The dotted grids are an additional region surrounding the main region, i.e., surrounding the touch area of the touch. The additional region of the dotted grids may be regarded as a guard region serving as a guard band or guard interval. In the fingerprint region $R_R$, the main region is mandatory and the additional region is optional. In the embodiment illustrated in FIG. 2, the fingerprint region $R_R$ comprises the main region and the additional region. In other embodiments, the fingerprint region $R_R$ may only comprise the main region but comprise no additional region. In other words, the area of the fingerprint region may be determined according to design requirement.

After the fingerprint region $R_R$ is determined, the fingerprint sensing control circuit 124 performs the fingerprint sensing operation on the fingerprint region $R_R$ during a sensing time $T_R$. Meanwhile, the electronic device 12 or the touch sensing control circuit 122 performs the touch sensing operation only on the white grids representing the sensing region $R_S$ but does not perform the touch sensing operation on the fingerprint region $R_R$ during the sensing time $T_R$.

In the touch sensing perspective, it (i.e., not performing the touch sensing operation on the fingerprint region $R_R$) can be viewed that the electronic device 12 masks the fingerprint region $R_R$ during the sensing time $T_R$ for the touch sensing operation.

Details of the electronic device 12 masking the fingerprint region $R_R$ (or not performing the touch sensing operation on the fingerprint region $R_R$) during the sensing time $T_R$ are not limited. In an embodiment, the touch sensing control circuit 122 may stop transmitting one or more driving signals corresponding to the fingerprint region during the sensing time $T_R$. For example, the touch sensing control circuit may be coupled to a plurality of transmitting/driving electrodes disposed by the panel 14. The plurality of driving electrodes comprises a plurality of first driving electrodes and a plurality of second driving electrodes. The plurality of first driving electrodes has intersection with the fingerprint region $R_R$ while the plurality of second driving electrodes has no intersection with the fingerprint region $R_R$. During the sensing time $T_R$, the touch sensing control circuit 12 may transmit no driving signal on the plurality of first driving electrodes having intersection with the fingerprint region $R_R$.

In the same or alternative embodiment, the touch sensing control circuit 122 may stop receiving a sensing signal corresponding to the fingerprint region $R_R$ during the sensing time $T_R$. For example, the touch sensing control circuit 122 may be coupled to a plurality of receiving/sensing electrodes disposed by the panel 14. The plurality of sensing electrodes comprises a plurality of first sensing electrodes and a plurality of second sensing electrodes. The plurality of first sensing electrodes has intersection with the fingerprint region $R_R$ while the plurality of second sensing electrodes has no intersection with the fingerprint region $R_R$. During the sensing time $T_R$, the touch sensing control circuit 122 may cease receiving sensing signals from the plurality of first sensing electrodes having intersection with the fingerprint region $R_R$. In some embodiments, the driving electrodes corresponding to the fingerprint region $R_R$ are still driven but the sensing electrodes corresponding to the fingerprint region $R_R$ are not sensed. In some other embodiments, the driving electrodes corresponding to the fingerprint region $R_R$ are not driven and the sensing electrodes corresponding to the fingerprint region $R_R$ are not sensed, either.

It is noted that the sensing electrodes may be the same as the driving electrodes, for example, for a self-capacitance touch display panel, and the sensing electrodes may be the different from the driving electrodes, for example, for a self-capacitance touch display panel. The making mechanism can be applied to these two types of touch display panel.

In the same or alternative embodiment, the touch sensing control circuit 122 may stop processing a sensing signal corresponding to the fingerprint region $R_R$ during the sensing time $T_R$. Specifically, during the sensing time $T_R$, the touch sensing control circuit 122 may receive the sensing signal from all sensing electrodes, and perform further signal processing (e.g., a front-end signal processing and/or an analog-to-digital converting processing and/or digital processing) on the sensing signals only received from the plurality of second sensing electrodes having no intersection with the fingerprint region $R_R$, but not perform the further signal processing on the sensing signals received from the plurality of first sensing electrodes having intersection with the fingerprint region $R_R$. In some embodiments, the sensing electrodes corresponding to the fingerprint region $R_R$ are still sensed to obtain sensing signals from sensing electrodes but the received sensing signals corresponding to the fingerprint region $R_R$ are not processed. In some other embodiments, the sensing electrodes corresponding to the fingerprint region $R_R$ are not sensed without providing sensing signals to be processed.

In another embodiment, whether or not the touch sensing control circuit 122 performs further processing on the sensing signal received from the plurality of first sensing electrodes having intersection with the fingerprint region $R_R$, the processer 120 discards output signal(s), output by the touch sensing control circuit 122, corresponding to the fingerprint region $R_R$ or corresponding to the plurality of first sensing electrodes having intersection with the fingerprint region $R_R$, during the sensing time $T_R$.

In an embodiment, the processor 120 receives the location information LI from the touch sensing control circuit 122, determines the fingerprint region $R_R$ according to the location information LI, and controls the fingerprint sensing control circuit 124 to perform the fingerprint sensing operation on the fingerprint region $R_R$ during the sensing time $T_R$. In addition, the processor 120 also controls the electronic device 12 or the touch sensing control circuit 122 to perform the touch sensing operation on the sensing region $R_S$ except the fingerprint region $R_R$ during the sensing time $T_R$.

Figure 3:
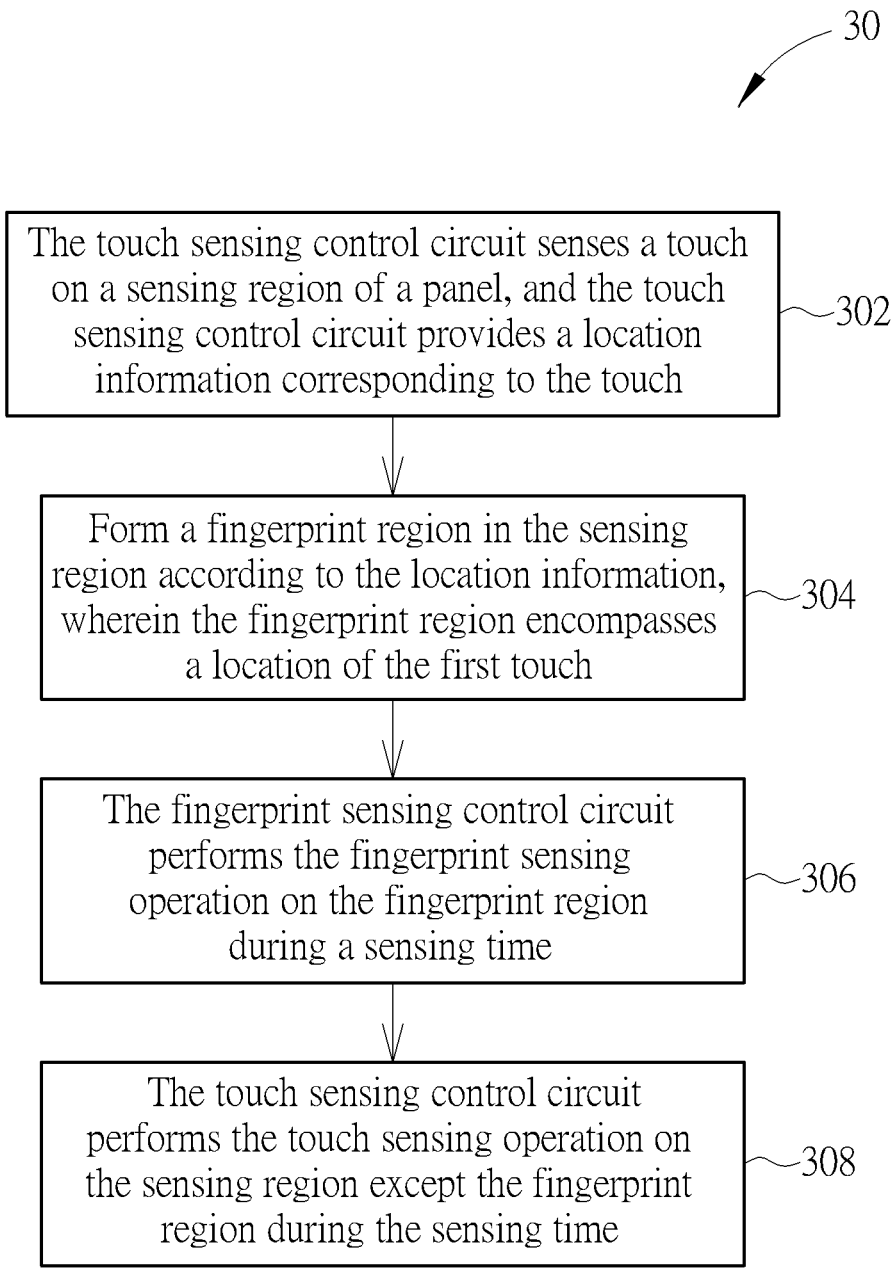
FIG. 3 is a schematic diagram of a process according to an embodiment of the present invention.

Operation of the electronic device 12 can be summarized as a process 30 as shown in FIG. 3. The process 30 is executed by the electronic device 12, and comprises the following steps.

Step 302: The touch sensing control circuit senses a touch on a sensing region of a panel, and the touch sensing control circuit provides a location information corresponding to the touch.

Step 304: Form a fingerprint region in the sensing region according to the location information, wherein the fingerprint region encompasses a location of the first touch.

Step 306: The fingerprint sensing control circuit performs the fingerprint sensing operation on the fingerprint region during a sensing time.

Step 308: The touch sensing control circuit performs the touch sensing operation on the sensing region except the fingerprint region during the sensing time.

Note that, the process 30 is for single fingerprint sensing, which is not limited thereto. The process 30 can be extended toward multiple fingerprints recognition. For example, the touch sensing control circuit 122 may sense a plurality of touches on the panel at a same time, and provide location information LI corresponding to the plurality of touches. According to the location information LI, one or more fingerprint regions $R_R$ are determined, where the one or more fingerprint regions $R_R$ encompass touch areas of the plurality of touches onto the panel 14. The fingerprint sensing control circuit 124 performs the fingerprint sensing operation on the one or more fingerprint regions $R_R$ during the sensing time $T_R$. During the sensing time $T_R$, the touch sensing control circuit 122 performs the touch sensing operation on the panel 14 (or the sensing region $R_S$) except the one or more fingerprint regions $R_R$ during the sensing time $T_R$. In other words, during the sensing time $T_R$, the touch sensing control circuit 122 does not perform the touch sensing operation on the one or more fingerprint regions $R_R$.

In addition, if the fingerprint pressed by the user moves on the panel 14, the electronic device 12 is able to track the movement of the fingerprint by updating the location of the fingerprint region $R_R$. Specifically, the touch sensing control circuit 122 may sense a first touch at a first time t1 and provide a first location information LI1 corresponding to the first touch, and a first fingerprint region $R_{R1}$ is determined according to the first location information LI1, given that the electronic device 12 has determined that the first touch is a first fingerprint. After the first time t1, the touch sensing control circuit 122 may sense a second touch at a second time t2 and provide a second location information LI2 corresponding to the second touch. According to the second location information LI2, a second/updated fingerprint region $R_{R2}$ is determined, where the second/updated fingerprint region $R_{R2}$ encompasses a touch area of the second touch, given that the electronic device 12 has determined that the second touch is a second fingerprint. The fingerprint sensing control circuit 124 may perform the fingerprint sensing operation on the second/updated fingerprint region $R_{R2}$ during a second sensing time $T_{R2}$. During the second sensing time $T_{R2}$, the touch sensing control circuit 122 performs the touch sensing operation on the sensing region $R_S$ (or on the entire panel 14) except the second/updated fingerprint region $R_{R2}$. That is, during the second sensing time $T_{R2}$, the touch sensing control circuit 122 does not perform the touch sensing operation on the second/updated fingerprint region $R_{R2}$, where the second/updated fingerprint region $R_{R2}$ is determined according the second location information LI2 corresponding to the second touch sensed at the second time t2. Besides, the touch sensing control circuit 122 may or may not perform the touch sensing operation on the first/original fingerprint region $R_{R1}$ during the second sensing time $T_{R2}$.

Figure 4:
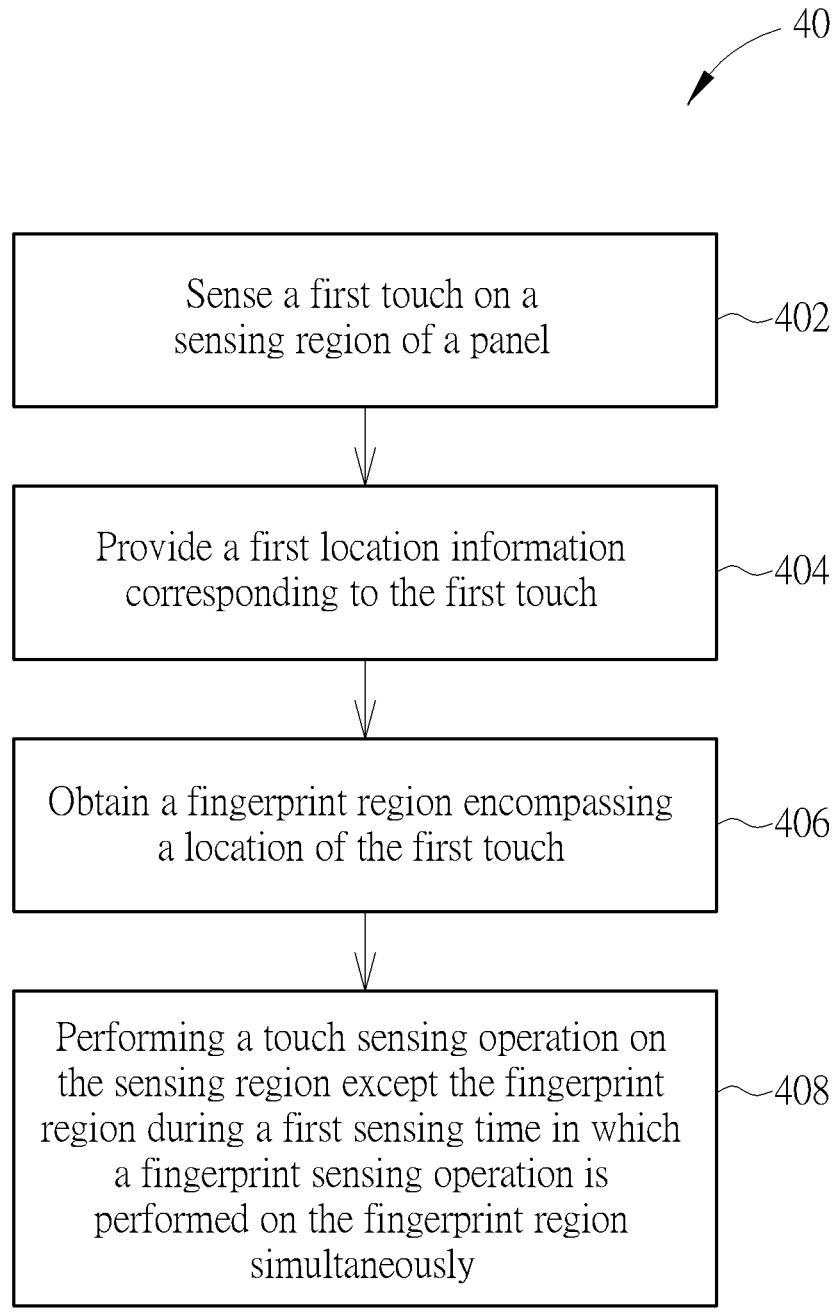
FIG. 4 is a schematic diagram of a process according to an embodiment of the present invention.

It is noted that in one embodiment, a method 40 is disclosed and shown in FIG. 4. The method 40 can be performed by a touch sensing control circuit to be able to perform a touch sensing operation simultaneous with a fingerprint sensing operation performed by a fingerprint sensing control circuit. The method 40 include sensing a first touch on a sensing region of a panel (Step 402); providing a first location information corresponding to the first touch (Step 404); obtaining a fingerprint region encompassing a location of the first touch (Step 406); and performing a touch sensing operation on the sensing region except the fingerprint region during a first sensing time in which a fingerprint sensing operation is performed on the fingerprint region simultaneously (Step 408), wherein the fingerprint region is determined in the sensing region according to the first location information to encompass a location of the first touch. The fingerprint region can be masked during the sensing time for the touch sensing operation.

Figure 5:
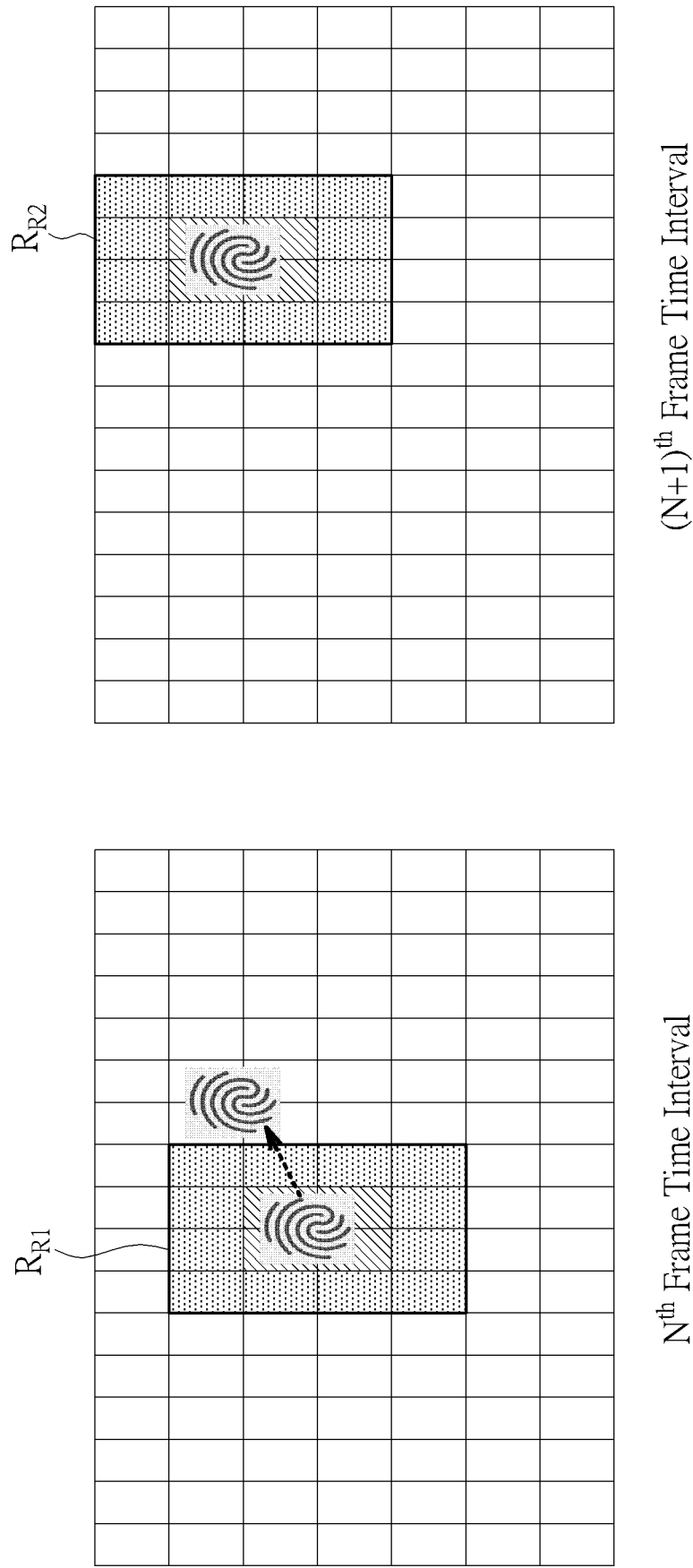
FIG. 5 is a schematic diagram of an original fingerprint region and an updated fingerprint region according to an embodiment of the present invention.

For example, FIG. 5 illustrates the fingerprint regions $R_{R1}$ and $R_{R2}$ according to an embodiment of the present invention. Before (or at a beginning of) an $N^{th}$ frame time interval, the first fingerprint region $R_{R1}$ is determined. Within the $N^{th}$ frame time interval, the fingerprint moves, as illustrated in the left portion of FIG. 4. The touch sensing control circuit 122 may then sense the second touch and the second/updated fingerprint region $R_{R2}$ is determined corresponding to a $(N+1)^{th}$ frame time interval, as illustrated in the right portion of FIG. 5.

Notably, the embodiments stated in the above are utilized for illustrating the concept of the present invention. Those skilled in the art may make modifications and alterations accordingly, and not limited herein. For example, an area (and/or shape and/or size etc.) of the fingerprint regions $R_R$ can be fixed or time-varying. Specifically, in an embodiment, the area of the fingerprint region $R_R$ may be fixed when the touch area of the touch varies with respect to time. In another embodiment, the area of the fingerprint region $R_R$ may vary according to the touch area of the touch, which is also within the scope of the present invention.

In summary, the embodiments provide method or electronic devices capable of determining at least one fingerprint region for the fingerprint sensing operation. When the fingerprint sensing operation is performed on the at least one fingerprint region, the touch sensing operation is performed on a sensing region (e.g., the entire region or a partial region of the display region) except the fingerprint region. That is, the touch sensing control circuit does not perform the touch sensing operation on the fingerprint region during the sensing time of performing the fingerprint sensing operation. Accordingly, interference between touch sensing and fingerprint sensing can be reduced.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An electronic device capable of performing a touch sensing operation and a fingerprint sensing operation simultaneously, the electronic device comprising:
a touch sensing control circuit; and
a fingerprint sensing control circuit;
wherein the touch sensing control circuit senses a first touch on a sensing region of a panel, and the touch sensing control circuit provides a first location information corresponding to the first touch;
wherein a fingerprint region is determined in the sensing region according to the first location information, and the fingerprint region encompasses a location of the first touch;
wherein the fingerprint sensing control circuit performs the fingerprint sensing operation on the fingerprint region during a first sensing time, and the electronic device performs the touch sensing operation on the sensing region except the fingerprint region during the first sensing time.

2. The electronic device of claim 1, wherein the fingerprint region is determined after the first touch is determined to be a fingerprint.

3. The electronic device of claim 1, wherein the first touch is determined to be the fingerprint when a touch time of the first touch is longer than a threshold time.

4. The electronic device of claim 1, wherein the fingerprint region comprises a main region including a touch area of the first touch.

5. The electronic device of claim 4, wherein the fingerprint region comprises an additional region surrounding the touch area of the first touch.

6. The electronic device of claim 1, wherein the electronic device is configured to mask the fingerprint region during the first sensing time for the touch sensing operation.

7. The electronic device of claim 1, wherein the touch sensing control circuit is configured to stop transmitting a driving signal corresponding to the fingerprint region during the first sensing time.

8. The electronic device of claim 1, wherein the touch sensing control circuit is configured to stop receiving a sensing signal corresponding to the fingerprint region during the first sensing time.

9. The electronic device of claim 1, wherein the touch sensing control circuit is configured to stop processing a sensing signal corresponding to the fingerprint region during the first sensing.

10. The electronic device of claim 1, further comprising a processor coupled to the touch sensing control circuit, wherein the processor is configured to discard an output signal corresponding to the fingerprint region provided by the touch sensing control circuit during the first recognition time.

11. The electronic device of claim 1, further comprising a processor, wherein the processor is configured to receive the first location information from the touch sensing control circuit, determine the fingerprint region according to the first location information, control the fingerprint sensing control circuit to perform the fingerprint sensing operation on the fingerprint region during the first sensing time, and control the electronic device to perform the touch sensing operation on the sensing region except the fingerprint region during the first sensing time.

12. The electronic device of claim 1, wherein
the touch sensing control circuit senses a plurality of first touches on the panel, and the touch sensing control circuit provides first location information corresponding to the plurality of first touches;
one or more fingerprint regions are determined according to the first location information, and the one or more fingerprint regions encompass the plurality of touches;
the fingerprint sensing control circuit performs the fingerprint sensing operation on the one or more fingerprint regions during the first sensing time, and the electronic device performs the touch sensing operation on the panel except the one or more fingerprint regions during the first sensing time.

13. The electronic device of claim 1, wherein the electronic device is further configured to update the fingerprint region along with a movement of a fingerprint.

14. The electronic device of claim 13, wherein
the touch sensing control circuit is configured to first senses a second touch later than a time when the first touch is sensed;
the touch sensing control circuit provides second location information corresponding to the second touch; and
the fingerprint region is updated according to the second location information, and the second fingerprint region encompasses the second touch;
the fingerprint sensing control circuit is configured to perform the fingerprint sensing operation within the updated fingerprint region during a second sensing time, and the electronic device performs the touch sensing operation on the sensing region except the updated fingerprint region during the second sensing time.

15. The electronic device of claim 14, wherein the fingerprint region is updated after the second touch is determined to be a fingerprint.

16. The electronic device of claim 1, wherein an area of the fingerprint region is fixed when a touch area of the first touch varies.

17. The electronic device of claim 1, wherein an area of the fingerprint region varies according to a touch area of the first touch.

18. An electronic system capable of performing a touch sensing operation and a fingerprint sensing operation simultaneously, the electronic system comprising:
a panel; and
an electronic device, comprising:
a touch sensing control circuit; and
a fingerprint sensing control circuit;
wherein the touch sensing control circuit senses a first touch on a sensing region of the panel, and the touch sensing control circuit provides a first location information corresponding to the first touch;
wherein a fingerprint region is determined in the sensing region according to the first location information, and the fingerprint region encompasses a location of first the touch;
wherein the fingerprint sensing control circuit performs the fingerprint sensing operation on the fingerprint region during a first sensing time, and the electronic device performs the touch sensing operation on the sensing region except the fingerprint region during the first sensing time.

19. A method, applied in an electronic device, the method comprising:

sensing a touch on a sensing region of a panel, and
providing a location information corresponding to the touch;
forming a fingerprint region according to the location information, wherein the fingerprint region encompasses the touch;
performing a fingerprint sensing operation on the fingerprint region during a sensing time; and
performing a touch sensing operation on the sensing region except the fingerprint region during the sensing time.

20. The method of claim 19, further comprising:
masking the fingerprint region during the sensing time for the touch sensing operation.

21. An method capable of performing a touch sensing operation simultaneous with a fingerprint sensing operation, comprising:
sensing a first touch on a sensing region of a panel;
providing a first location information corresponding to the first touch;
obtaining a fingerprint region encompassing a location of the first touch;
performing a touch sensing operation on the sensing region except the fingerprint region during a first sensing time which a fingerprint sensing operation is performed by a fingerprint sensing control circuit on the fingerprint region simultaneously;
wherein the fingerprint region is determined in the sensing region according to the first location information.

22. The method of claim 21, further comprising:
masking the fingerprint region during the sensing time for the touch sensing operation.

* * * * *